Feb. 29, 1944.  J. BLACKBURN  2,342,915
CONTROL SWITCH FOR STEERING WHEELS
Filed Oct. 17, 1942
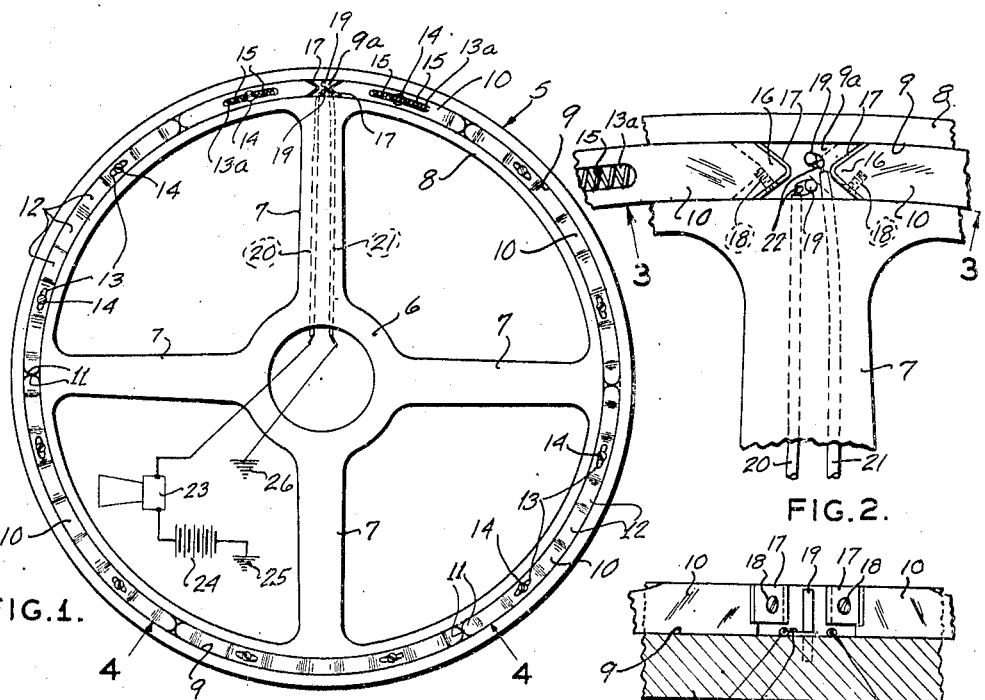
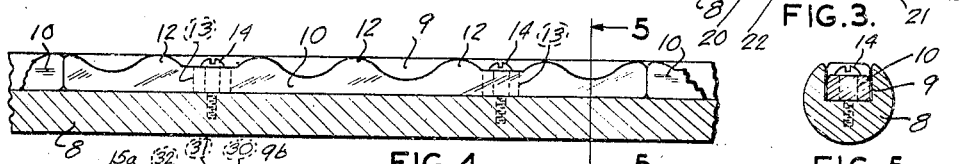
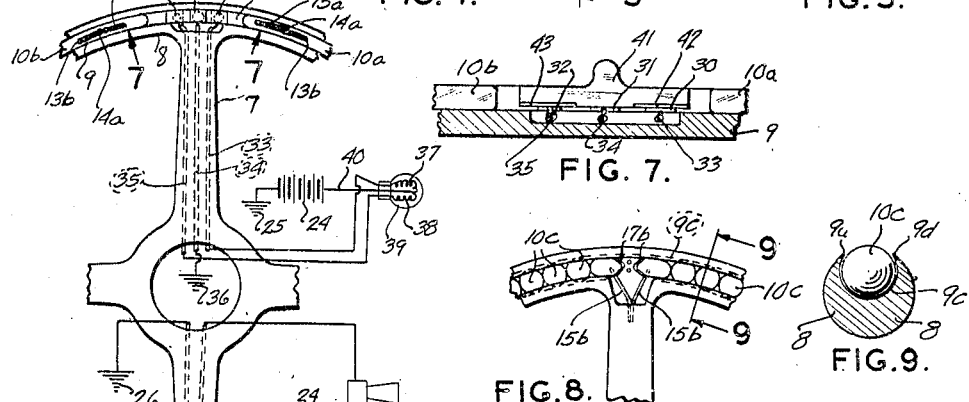
INVENTOR.
Jasper Blackburn
BY
W. E. Fisher
ATTORNEY Patented Feb. 29, 1944

2,342,915

UNITED STATES PATENT OFFICE 2,342,915

CONTROL SWITCH FOR STEERING WHEELS

Jasper Blackburn, Webster Groves, Mo.

Application October 17, 1942, Serial No. 462,403

4 Claims. (Cl. 200—52)

This invention relates to control switches for the lighting and horn sounding devices of a motor driven vehicle, such as an automobile, motor boat or airplane.

The prime object of the invention is to provide electrical switch assemblies and switch controls mounted on the steering wheel of the automobile or other motor vehicle, for the purpose of conveniently controlling the head lamps and horn of the vehicle, to the end that the driver may operate and control either the lights or the horn without removing his hands from the steering wheel.

A further object is to provide control switches on the steering wheel of a motor vehicle, such as an automobile, for operating the lights and horn thereof, including elements or members slidably extended around the rim or periphery of the wheel, whereby the said switches controlling the horn and lights may be conveniently operated by the hands of the driver from any point upon the said rim.

A further object of the invention is to provide in a steering wheel of the kind referred to and having electrical switches mounted on the rim thereof for controlling and operating the horn and signal lights of the vehicle upon which the wheel is assembled, switch controlling means slidably mounted around the rim of the wheel, whereby certain selected switches may be separately and independently operated by the hands of the driver at any point around the said rim.

A still further object of the invention is to provide in combination with the steering wheel of a motor vehicle, the rim of the wheel being circularly channeled out or grooved, elements slidably mounted within the said channel, and arranged through such slidable action to operate and control the electrical lights and horn of the vehicle, through switches or contacts also mounted upon the rim of the wheel in the line of movement of the said slidable elements.

With the above stated object in view, together with such other objects and advantages as may appear from the following specification, attention is directed to the accompanying drawing as embodying and illustrating certain preferred forms of the invention, and wherein:

Figure 1 is a plan view of the under side of an automobile steering wheel, having my invention incorporated thereupon, the rim of the wheel being channeled out at its under side to receive the elements of the invention, which are shown mounted in the said channel, the electrical wiring system of the assembly being shown diagrammatically.

Figure 2 is an enlarged, fragmental detail in plan, showing the fixed contacts of the horn switch unit, as seated within the channel of the rim, at the upper side of the wheel, together with the arrangement of the slidable control elements as mounted in the channel at either side of the fixed contacts, for movement to and from these contacts for closing or opening the electrical circuit through the horn.

Figure 3 is a section on the line 3—3 of Figure 2.

Figure 4 is an enlarged sectional view on the line 4—4 of Figure 1.

Figure 5 is a section on the line 5—5 of Figure 4.

Figure 6 is a fragmental view in plan of a modification of the invention, wherein both a horn switch as above referred to, and light switches or light switch contacts, are mounted in the channel of the wheel rim at opposite sides of the contacts, and showing the arrangement of the slidable switch controls at either side, the wiring being shown diagrammatically.

Figure 7 is an enlarged fragmental detail on the line 7—7 of Figure 6.

Figure 8 is a fragmental detail in plan, showing a modified form of the invention.

Figure 9 is a section on the line 9—9 of Figure 8.

This invention is designed for mounting upon a conventional steering wheel 5 of a motor vehicle, such as an automobile (not shown), the said wheel comprising the hub 6, spokes 7 and rim 8, and being anchored or adapted for mounting at the upper end of a hollow steering post in the usual manner, and the electrical wires for controlling the signals being extended up through the post, which is also a conventional arrangement.

In carrying out the present invention, a deep channel or groove 9 is cut out or formed around the under side of the rim 8, and a plurality of free elements are slidably mounted within this channel as switch controlling means. As shown in Figures 1 to 7 these elements 10 are formed arcuately or curvedly in plan, to correspond exactly with the curvature of the channel 9, and so as to fit accurately, freely and slidably into this channel. These arcuate elements or segments 10 may be of any desired length, but preferably they would be of equal length, and so that a certain number thereof will approximately fill the circuit of the channel, except for the relatively short space 9a reserved at one point of the channel immediately at the end of one of the spokes 7, wherein is mounted the horn contacts and switch later to be described. The elements 10 are of dielectric material and are rounded at their ends as shown at 11, for the sake of insuring uniform and free contact with each other within the channel, and they are also formed with a plurality of out-turned knobs or bosses 12, in order to provide convenient grips for the hands of the driver. Elongated slots 13 are cut through the elements 10 at points adjacent their ends, and headed screws 14 are passed freely through these slots and are seated into the rim 8 at the bottom of the channel 9, whereby the elements 10 are held slidably in place in the channel, and may be moved back and forth therein to the limited extent permitted by the length of the slots 13. These slots 13 immediately adjacent the ends of the space 9a (reserved for the horn switch and contacts) are relatively elongated or extended at each side of the screws 14, as shown at 13a, and coil springs 15 are seated within these slots at each side of the screws and are braced at their ends between the screws and the end margins of the slots. Thus these springs normally and resiliently urge all of the elements or segments 10 compactly together and away from the space 9a, so as to clear this space.

From the structures and assembly of elements as so far shown and described, it is obvious that the entire train of elements 10 may be conveniently pushed by either hand of the driver upon the wheel rim, towards either end of the space 9a, as may be required in the operation of the device and for sounding the horn, and as will be more fully explained later on.

The outer ends of the curved segments or elements 10, immediately adjacent the space 9a, are pointed off or sharply rounded, as shown at 16, and correspondingly pointed metallic caps or circuit closers 17 are firmly secured over these ends in any conventional manner, as by the screws 18. A pair of metallic electrical contacts or terminals 19 are seated in spaced relation in the rim 8, in the bottom of the channel 9 and medially of the space 9a, in a plane perpendicular to the plane of the wheel 5 and in a line extended radially from the hub of the wheel, in such position that either of the pointed caps 17 when moved inwardly for the purpose, will nose in between the said terminals 19 and contact both of them, thus closing any electrical circuit connected with the said terminals.

Electrical conductors or wires 20, 21 are connected with the inner ends of the terminals 19, as indicated at 22, and these wires are extended through the spoke 7 as shown, the wire 20 to the horn 23 which is in turn electrically connected with the battery 24 grounded at 25, while the other wire 21 is extended and grounded as indicated at 26 to any suitable point on the vehicle, as to the metallic hub 6 of the wheel 5.

In the operation of the assembly as so far described, and in order to sound the horn 23, all the driver has to do is to push the train of elements 10 in either direction, with either hand on the wheel rim, this action in turn causing one or the other of the caps 17 to close the circuit through the terminals 19 and the connected horn 23. When hand pressure is again released from the train of elements 10, they are automatically returned to their neutral position by the springs 15.

In Figures 6 and 7 is shown the same form of horn operating assembly, including the electrical contacts or terminals 19 and train of arcuate segments 10 terminated by the metallic circuit closers 17 at either side for operating the horn. But there is here shown in addition, switches or switch assemblies for controlling and operating the lighting system of the motor vehicle, the same being incorporated at the upper side of the wheel in the space 9b. In order to provide this space 9b, the train of elements or segments 10 of the previously described assembly is divided into two separate trains 10a, 10b, disposed in the channel 9 at either side of the wheel rim 8 and immediately at the end of one of the spokes 7 as shown, diametrically opposite to the described horn operating unit. In this modification the slots 13b in the ends of the segments 10a, 10b, at each side of the space 9b, are elongated as shown, similarly to the slots 13a of the previously described assembly, and coil springs 15a are mounted within these slots at each side of the retaining screws 14a. These springs together with the springs 14 at the opposite ends of the segments 10a, 10b, adjacent the horn operating unit, operate to hold the trains of segments 10a, 10b always pressed closely together at either side of the wheel and clear of the space 9b, reserved for the light control switch unit.

The light switch control unit comprises three metallic contact buttons 30, 31, 32, mounted in a row longitudinally in the bottom of the channel 9, medially of the space 9a provided therefor as aforesaid. The upper faces of these buttons are smoothed off in a common plane, and are electrically connected with the wires 33, 34, 35, which are extended through the adjacent spoke 7, the central or neutral wire 34 being grounded as indicated at 36 to any convenient metallic part of the vehicle, such as the hub 6. The other two wires 33, 35, are extended through the dimmer lighting filament 37 and the full strength lighting filament 38 of the lamp bulb 39, where they are joined to the common wire 40 which connects with the battery 24. An elongated, rectangular switch block 41 of dielectric material, and somewhat shorter than the space 9b, is slidably mounted within the said space, and has mounted on its lower face at each end thereof, metallic contact plates 42, 43, spaced apart medially as shown. The arrangement and dimensioning of the parts is such that as the switch block 41 is shifted to either end of the space 9b, either of the plates 42, 43 will serve to electrically connect the central or neutral wire 34 and either of the two outer wires 33, 35. Thus by merely moving this switch block 41 to either end of the space 9b, the circuit may be closed through either the dimmer filament or through the full strength filament, as desired. On the other hand, in the middle or neutral position of the block 41, neither of the wires 33 or 35 would be contacted, and no lights would be shown.

In Figure 8 is shown still another modification, wherein a train of marbles 10c is used to fill the channel 9c, in lieu of the arcuate elements heretofore described as control means for the horn switch unit of Figures 1 to 7, the margins of the channel being extended up and inwardly, as at 9d, for retaining the marbles in place. Also there is here shown a pair of divergent, stiff leaf springs 15b which normally serve to separate the circuit closers 17b, said springs being seated in and extended from the adjacent spoke 7. Otherwise the operation is as before explained relative to the assembly and horn control devices of Figures 1 to 7.

It is to be understood of course that all electrical elements are to be suitably insulated after conventional practice. Ordinarily the rims of steering wheels are of wood, hard rubber or other dielectric material, and frequently the spokes also are of hard rubber or the like material. Otherwise the wires as passed through the spokes, would need to be well insulated. The marbles as referred to in the third form modification of Figure 8, would be of any dielectric material. Any other desired signals in addition to the horn and lights, could be equally controlled from the rim of the steering wheel through the means here described, as for instance the right, left and stop traffic signals, commonly electrically operated.

While I have here shown and described certain preferred embodiments of the invention, and certain specific structural features thereof, the described structures and features may be changed or modified within the scope of the claims.

I claim:

1. In a device of the kind described, including a steering wheel channeled out around its rim, and there being electrical contacts mounted in the channel for controlling one or more signals, a train of disconnected dielectric elements freely and movably mounted within the channel, in an end-wise contactual relation and limited to axial movement along the channel, the circuitous train of elements being parted and spaced at its ends from the said electrical contacts of the channel, means for normally and resiliently holding the said train of elements from contact at its ends with the said electrical contacts of the channel, and circuit closers at the ends of the said train of elements adapted to close electrical circuits through the contacts of the channel when moved thereto.

2. In combination with the steering wheel of a motor vehicle, the rim of the wheel being uniformly channeled out, a plurality of free dielectric elements movably mounted in the channel, filling same laterally and arranged for limited reciprocable movement therein along the axis of the channel for controlling electrical switches mounted on the wheel, and means for resiliently holding the said elements to their normal neutral position in the channel.

3. In a steering wheel for a vehicle, the same having its circular rim channeled out peripherally, one or more trains of free and unconnected dielectric elements movably mounted in the channel in endwise contactual relation, spanning the channel laterally but adapted for limited axial reciprocable movement in the channel, spaces being provided at the ends of the trains of elements and within the channel for receiving electrical contacts, electrical contacts seated within the channel within the spaces provided as aforesaid, circuit closers at the ends of the trains of elements adapted to close electrical circuits through the said contacts of the channel when moved thereagainst, and means for normally and resiliently holding the trains of elements with their circuit closers at the ends thereof, to their inoperative positions clear of the said electrical contacts of the channel.

4. In a steering wheel formed with a peripheral channel around its rim and a train of dielectric elements movably mounted to travel axially within the channel, the said train of elements being parted to provide space thereat for electrical switching elements, a plurality of electrical contacts mounted in circumferential alignment within the said channel, and an elongated switch block of dielectric material somewhat shorter than the space provided at the parting of the train of elements, slidably mounted within said space, the same having mounted on its face contiguous with the said contacts metallic contact plates spaced apart medially to cover any two of the contacts to complete and close an electrical circuit as the block is reciprocated endwise within the channel.

JASPER BLACKBURN.